(12) United States Patent
Bordini

(10) Patent No.: US 8,042,628 B2
(45) Date of Patent: Oct. 25, 2011

(54) VEHICLE BODY AND ASSEMBLY METHOD

(75) Inventor: Giorgio Bordini, Modena (IT)

(73) Assignee: CNH America LLC, New Holland, PA (US)

( * ) Notice: Subject to any disclaimer, the term of this patent is extended or adjusted under 35 U.S.C. 154(b) by 280 days.

(21) Appl. No.: 12/209,083

(22) Filed: Sep. 11, 2008

(65) Prior Publication Data

US 2009/0065270 A1    Mar. 12, 2009

(30) Foreign Application Priority Data

Sep. 11, 2007  (EP) .................................... 07425558

(51) Int. Cl.
*B62D 55/04*  (2006.01)
*B62D 55/13*  (2006.01)
*B62D 55/30*  (2006.01)

(52) U.S. Cl. ...................... 180/9.21; 180/9.56; 180/9.42; 180/371; 305/135; 305/142; 305/146

(58) Field of Classification Search .................... 180/9.1, 180/9.21, 9.26, 9.5–9.6; 305/146, 149
See application file for complete search history.

(56) References Cited

U.S. PATENT DOCUMENTS

| | | | | |
|---|---|---|---|---|
| 1,402,134 | A * | 1/1922 | Austin | 180/9.54 |
| 1,572,943 | A * | 2/1926 | McKinley | 192/13 R |
| 2,076,009 | A * | 4/1937 | Starr et al. | 180/9.6 |
| 3,645,350 | A * | 2/1972 | Deli et al. | 180/9.1 |
| 4,230,199 | A * | 10/1980 | Stedman | 180/9.1 |
| 4,331,208 | A * | 5/1982 | Kolthoff et al. | 180/6.2 |
| 6,199,646 | B1 * | 3/2001 | Tani et al. | 180/9.21 |
| 6,336,690 | B2 * | 1/2002 | Toms et al. | 305/145 |

* cited by examiner

*Primary Examiner* — Tony H. Winner
*Assistant Examiner* — Wesley Potter
(74) *Attorney, Agent, or Firm* — Sue C. Watson; Patrick Sheldrake

(57) ABSTRACT

A vehicle, having a main body is equipped to be fitted mechanically with devices to form a wheeled vehicle, or with devices to form a crawler vehicle.
The main body having of the vehicle houses the common components utilized in both configurations such as the engine and the gear box of the vehicle.

16 Claims, 16 Drawing Sheets

VEHICLE BODY AND ASSEMBLY METHOD

The invention relates generally to a vehicle, in particular a farm tractor that may be equipped as a wheeled vehicle or track crawler vehicle.

Vehicles, in particular farm vehicles, are divided into two main groups: wheeled vehicles; and crawler vehicles. As vehicle manufacturing becomes increasingly industrialized, it would be beneficial to standardize component part production to cater to all types of both wheeled and crawler vehicles.

The use of a "main body" has been conceived from the realization that, at present, wheeled and crawler vehicles share structural component parts, such as the engine, etc., but differ substantially regarding power trains, hydraulic systems, driver's seat, rolling gear configurations, the way in which the vehicle is driven and perceived as a whole, and in-service vehicle performance.

A new design and manufacturing approach, i.e. to derive crawler vehicles from wheeled vehicles, with as few alterations as possible would be beneficial. In the approach utilizing common parts, crawler and wheeled vehicles may share:
  power plant and accessories;
  main power train;
  seat, cab, and controls;
  hydraulic system and accessories;
  implement hitch;
  hood and below-hood systems;
and differ, or may differ, as regards:
  rolling gear, tracks and carriages for crawler vehicles, rubber-tyred wheels for wheeled vehicles;
  power transmission between the main power train and tracks and wheels, respectively;
  structural connecting members of carriages and wheels, respectively.

The shared parts can greatly outweigh the dedicated parts of the two types of vehicles in terms of technical and commercial value. Crawler vehicles can benefit from this approach with respect to the availability of wheeled-vehicle "main body" technology at zero overall cost; multiple basic power train models and variations; joint market image benefits and; spares and servicing standardization.

This Greater integration of the production lines of different models can be achieved by designing a standard "main assembly"—hereinafter referred to as "main body"—suitable for all types of vehicles (wheeled or crawler), and to which the characteristic wheeled or crawler vehicle components are carriaged.

Producing one "main body" for multiple types of vehicles would result in an enormous saving, in terms of manufacturing cost. This invention generally provides a "main assembly"—hereinafter referred to as "main body" for coupling the component parts of the vehicle.

Moreover, innovation being traditionally greater in wheeled vehicle as opposed to crawler vehicle manufacture, using the same "main body" for both means any innovations to wheeled vehicles can also be applied at zero cost to crawler vehicles. To obtain a wheeled vehicle from a prefabricated "main body", the "main body" is fitted with all the devices and steering means of a two- or four-wheel-drive vehicle.

Conversely, a crawler vehicle can be configured from the same "main body" by fitting the "main body" with track drive wheel power transmission devices, track supporting means, and relative steering means, all compatible with a standard wheeled and crawler vehicle "main body" and main power train.

Regarding vehicle steering, a main power train, frequently used with wheeled vehicles, may also be used advantageously on crawler vehicles, which traditionally have no differential between the track power output shafts. In a crawler vehicle with a wheeled vehicle main power train, steering is controlled by a differential output speed control device.

Improvement can thus be achieved by standardizing the major part of the cost and value of different types of vehicles, for the industrial, commercial, and functional reasons referred to above; identifying and solving the problems involved (crawler steering, front and rear undercarriage support, final drives,)

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

For the sake of simplicity, the following description refers solely to the mechanical parts and devices indispensable for a clear understanding of the present invention.

Figure 1:
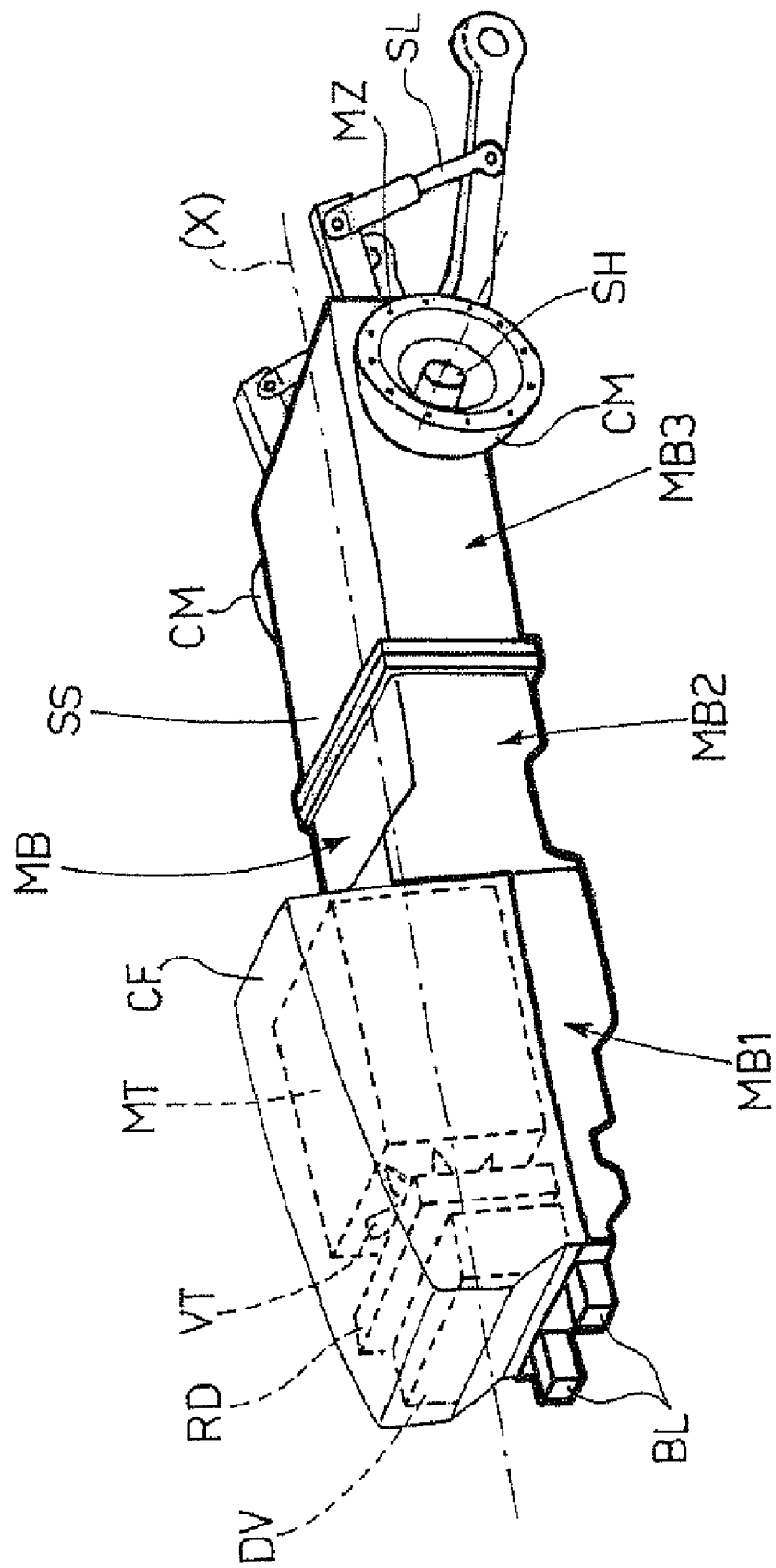
FIG. 1 shows a three-dimensional view of a "main body" of the vehicles according to the present invention.

Main body MB substantially comprises a hollow carriage housing many of the essential operating parts of a vehicle (not shown as a whole in FIG. 1).

Figure 2:
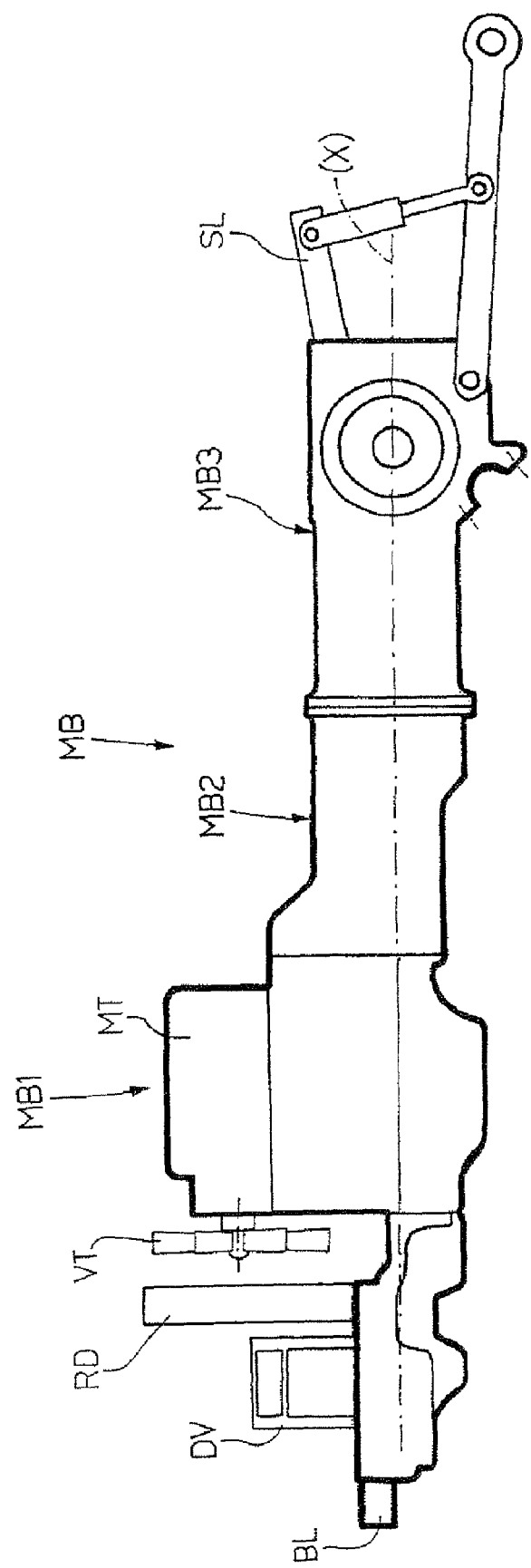
FIG. 2 shows a side view of the FIG. 1 "main body"
Figure 3:
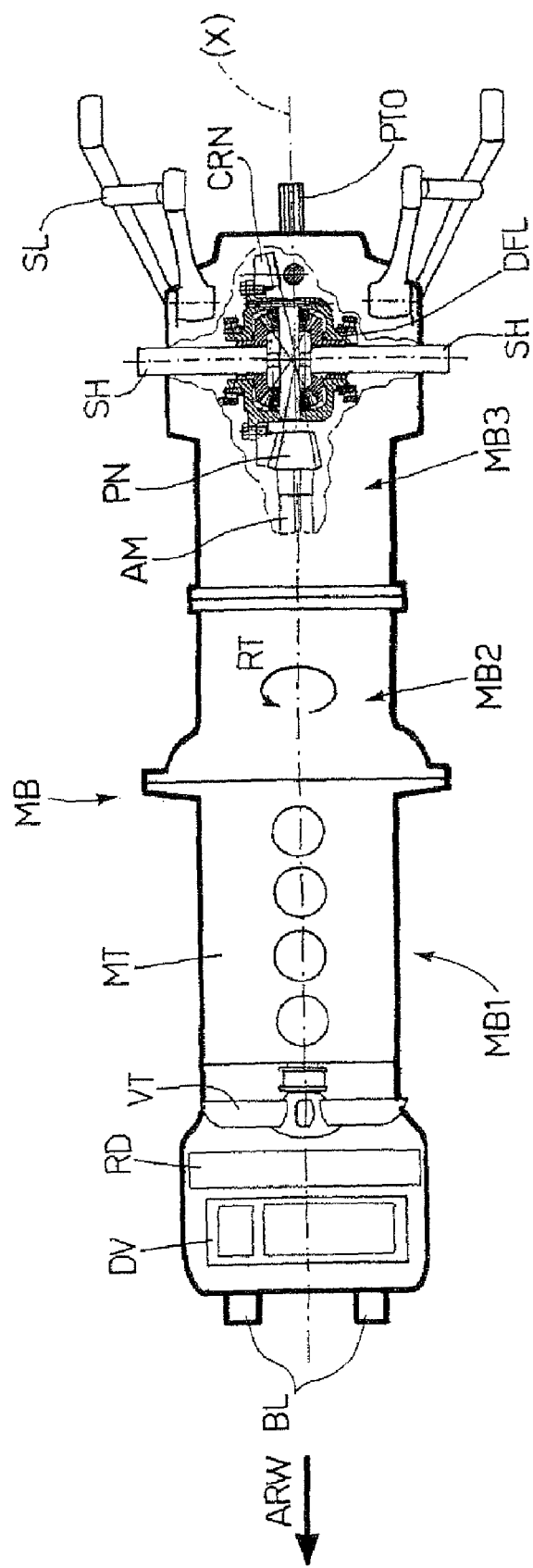
FIG. 3 shows a plan view of a first embodiment of the FIGS. 1 and 2 "main body"

Main body MB has a substantially box-shaped supporting structure SS. As shown in FIGS. 1, 2, 3, main body MB is divided into three parts, i.e. a front portion MB1, an intermediate portion MB2, and a rear portion MB3. Front portion MB1 supports and houses an engine MT; a radiator RD and fan VT; and a front casing DV containing various devices (e.g. a battery, coolant pump, etc.). Front portion MB1 also has two ballast carriages BL (ballast not shown); and a hood CF (FIG. 1).

Intermediate portion MB2 comprises a box body housing at least a clutch (not shown), a gearbox (not shown), and possibly an inverter (not shown).

Rear portion MB3 also substantially comprises a box body housing the speed reducers (not shown) and possibly a differential DFL (FIG. 3 or 4), or a bevel pinion/ring gear transmission (not shown), the output shafts SH of which project laterally with respect to a longitudinal axis (X) of substantial symmetry of main body MB as a whole.

With reference to FIG. 3, a drive shaft AM, powered by engine MT, rotates in the direction of arrow RT, thus rotating a bevel pinion PN, fitted to the end of drive shaft AM, in the same direction. This configuration of differential DFL applies when using main body MB to produce a wheeled vehicle or triangular-track crawler vehicle, but not for producing a rectangular-track crawler vehicle (see below).

In the FIG. 3 example, the ring gear CRN of differential DFL must be located on the right of main body MB, in the travelling direction of the vehicle indicated by arrow ARW. The FIG. 3 "right-side" configuration of differential DFL, with respect to the travelling direction of the vehicle shown by arrow ARW, improves the ability of the drive wheels (not shown in FIG. 3) of a wheeled or triangular-track crawler vehicle turn in the right direction.

Conversely, using main body MB to produce a rectangular-track crawler vehicle calls for a "left-side" ring gear CRN configuration with respect to the travelling direction of the vehicle shown by arrow ARW (FIG. 4) (i.e. turned 180° with respect to the "right-side" configuration). Otherwise, since pinion PN still rotates in the direction of arrow RT, the drive wheels (not shown in FIG. 4) would turn in the reverse direction of the vehicle, opposite the direction shown by arrow ARW. As stated, differential DFL is optional Rear portion MB3 also comprises two casings CM projecting from opposite sides of axis (X), and each of which houses a projecting portion of a respective output shaft SH of differential DFL, and has a flange FL with means MZ for assembling respective devices (see below) characteristic of a wheeled or crawler vehicle.

Rear portion MB3 is also fitted with an implement lifter SL (implements not shown), and a PTO shaft projects from rear portion MB3 (FIG. 3).

Figure 6:
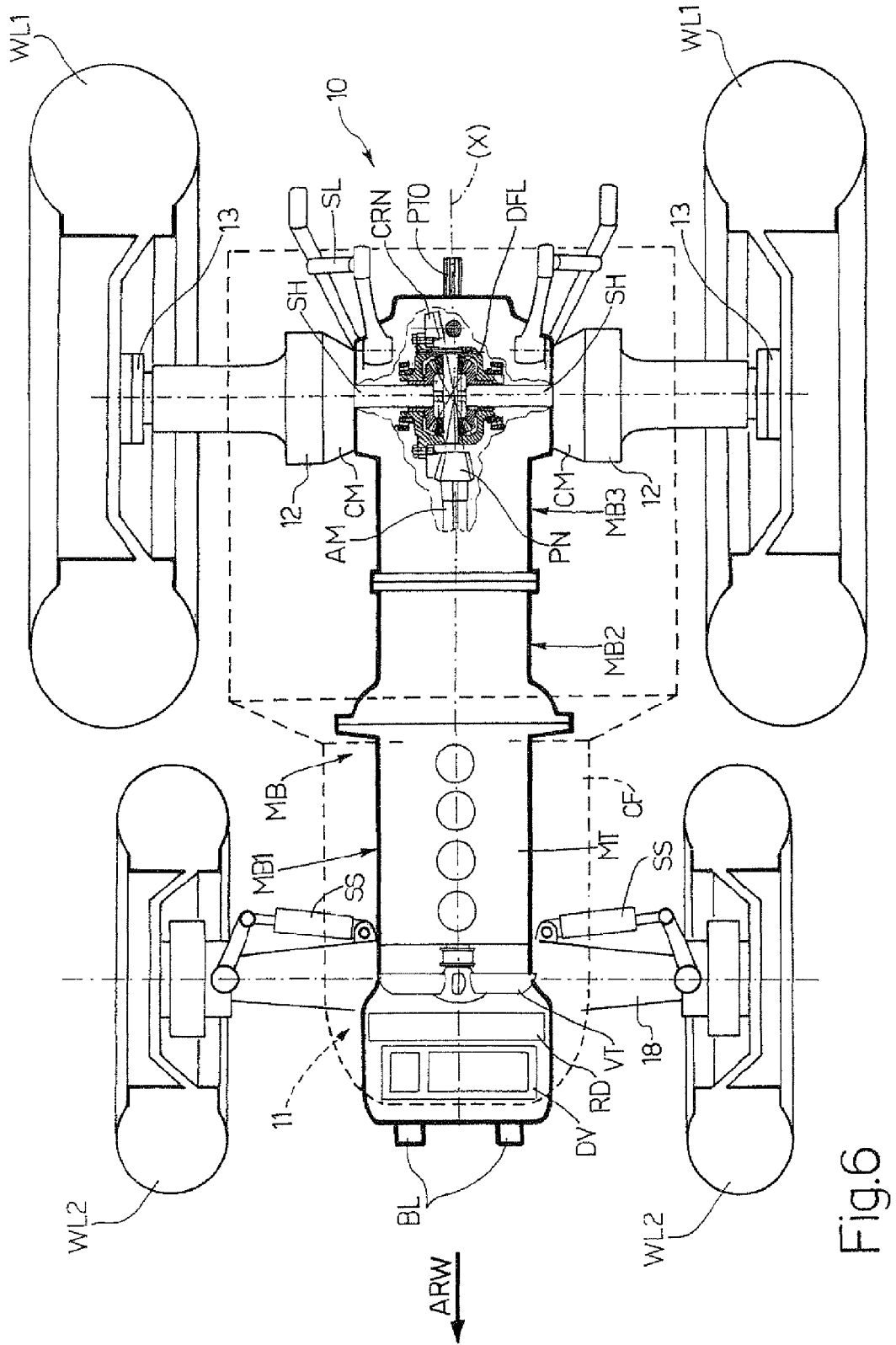
FIG. 6 shows a plan view of a first embodiment of a wheeled vehicle featuring the FIGS. 1, 2 and 3 "main body"
Figure 7:
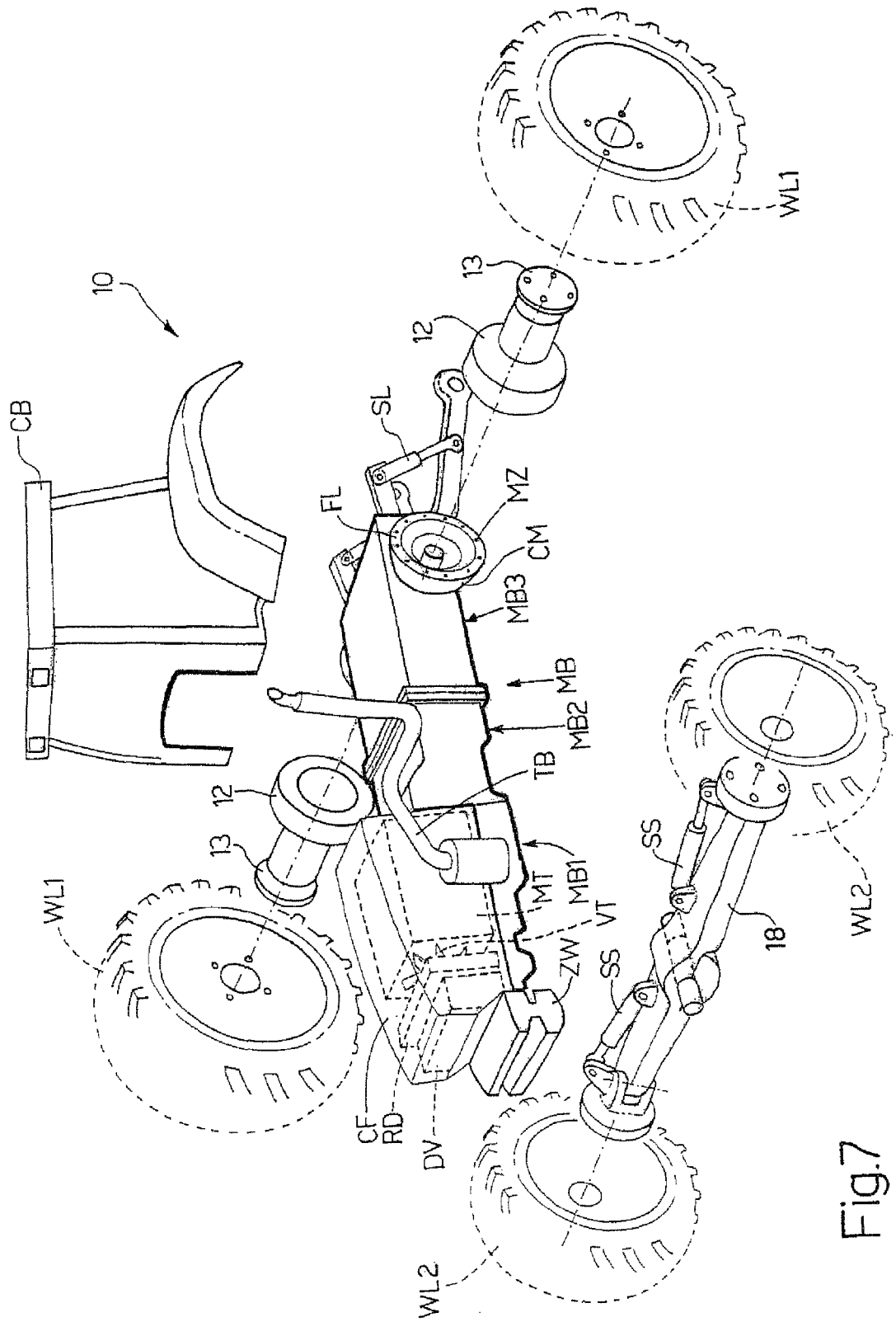
FIG. 7 shows an exploded view of the FIG. 6 wheeled vehicle.

In the first embodiment in FIGS. 6 and 7, a wheeled vehicle 10 comprises the FIG. 1-3 main body MB, and a vehicle body 11 covering main body MB.

In wheeled vehicle 10, differential DFL is essential, and is connected mechanically to and powered by a drive shaft AM. In FIGS. 6 and 7, number 12 indicates a speed reducer, and 13 a flange for connection to a respective rear wheel WL1; and each speed reducer 12 is bolted, using means MZ, to a respective side flange FL of rear portion MB3. A brake device (not shown) may be interposed between reducer 12 and flange 13.

The two ballast carriages BL are fitted with ballast ZW (FIG. 7).

A front axle 18, supporting two front wheels WL2, is attached to front portion MB1 by conventional means, and is fitted with a conventional steering system SS.

As shown in FIG. 7, vehicle 10 also comprises an exhaust pipe TB connected to engine MT; and a cab CB.

Figure 4:
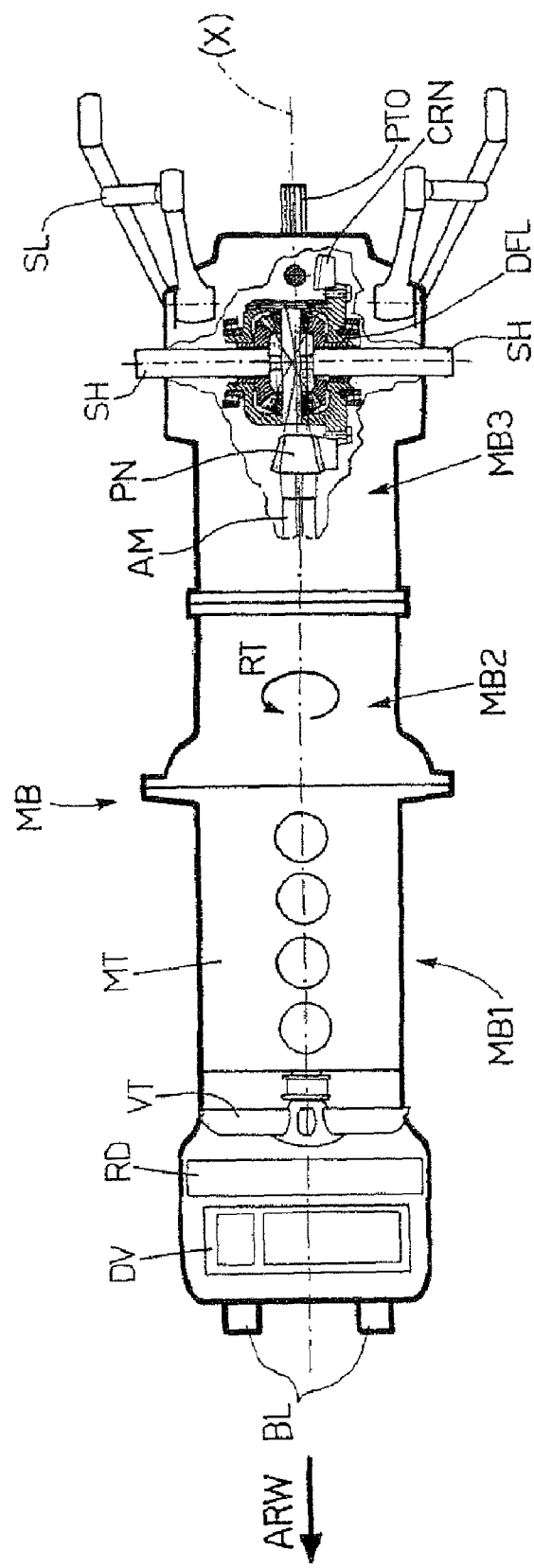
FIG. 4 shows a plan view of a second embodiment of the FIGS. 1 and 2 "main body"
Figure 8:
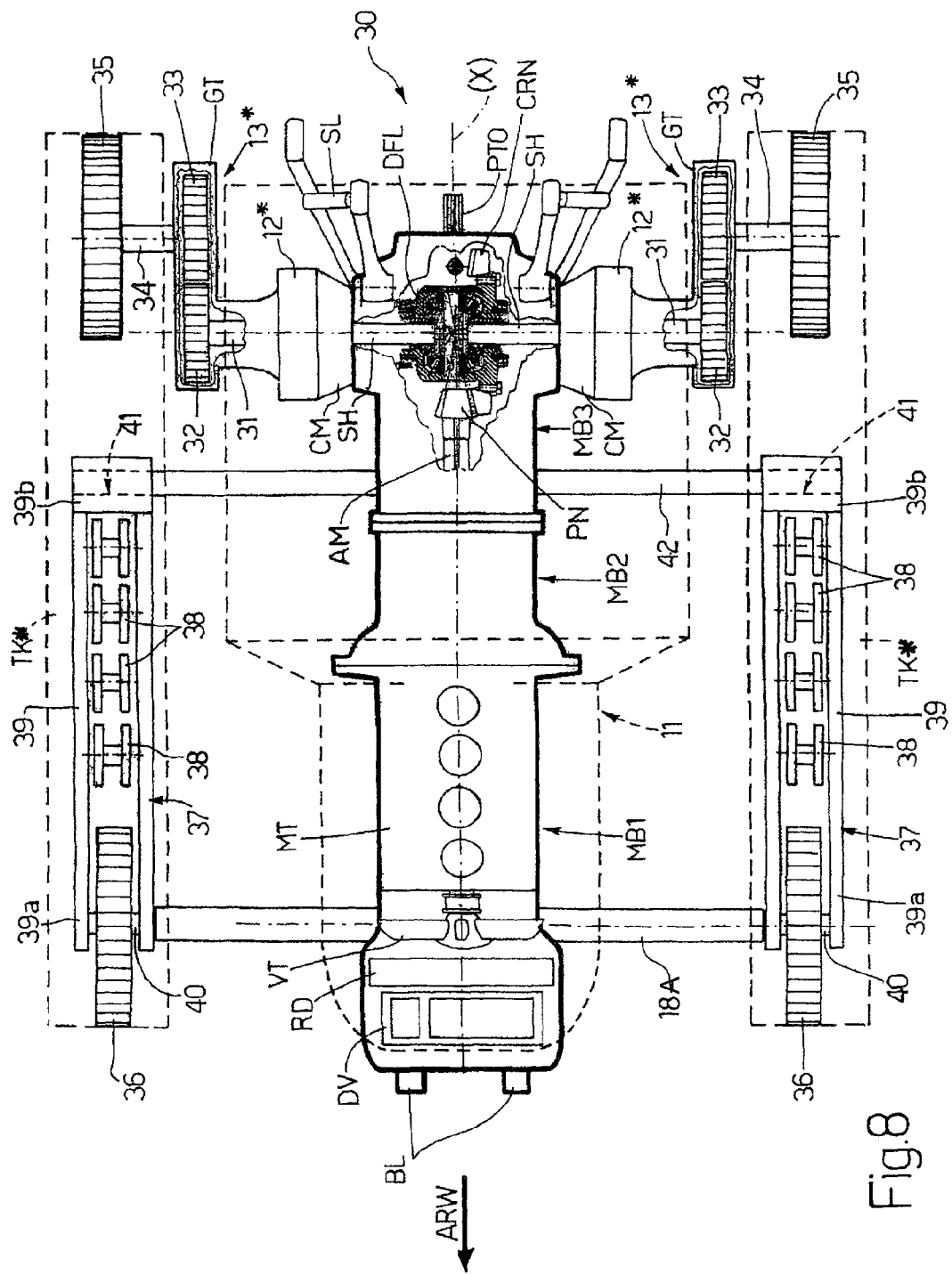
FIG. 8 shows a plan view of a second embodiment of a crawler vehicle featuring the FIGS. 1, 2 and 4 "main body"
Figure 9:
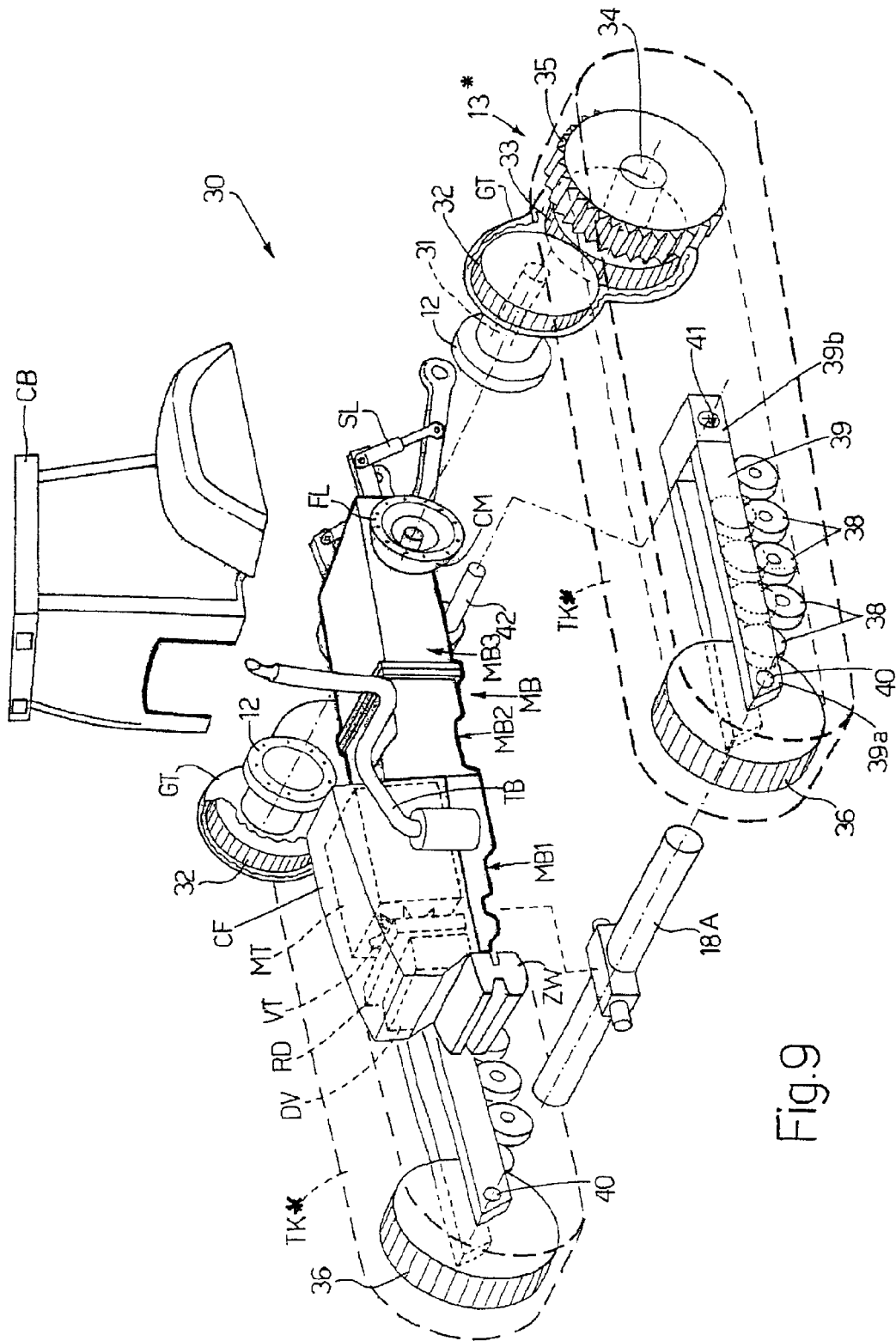
FIG. 9 shows an exploded view of the FIG. 8 crawler vehicle.

The FIGS. 1, 2 and 4 main body MB may be used to produce a crawler vehicle 30 (as shown in the FIGS. 8 and 9 embodiment).

A hub 31, connected mechanically to the casing of a hydrostatic steering motor 12*, is fitted with a gear 32, which meshes with a gear 33 integral with a shaft 34 fitted with a drive wheel 35 of a track TK*. Gears 32 and 33 are housed in a so-called "guitar" case GT, and form part of a speed reducer 13*.

Hydrostatic steering motors 12* are only necessary if main body MB is also equipped with differential DFL. Differential DFL, hydrostatic steering motors 12*, and speed reducers 13* as a whole form a steering assembly for rear wheels WL1. This vehicle differential steering assembly may comprise a first and a second axle shaft coaxial with each other and connected to respective drive wheels of the vehicle. A differential is interposed between the two axle shafts to achieve different angular speeds of the axle shafts, while maintaining a constant total angular speed.

The first and second axle shaft have respective power units connected to each other by a circuit comprising a device for controlling and regulating power exchange between the power units, so that the difference in rotation speed of the two axle shafts is determined by power exchange between the two power units.

The above differential steering system:
1. requires an ordinary differential;
2. is compatible with an ordinary differential;
3. does not interfere with power transmission to the ground, which remains predominantly mechanical (with none of the losses typically associated with hydraulic power transmissions);
4. provides for speed-sensitive steering, which is unknown in conventional crawler vehicles;
5. does not reduce vehicle speed when steering, unlike conventional crawler vehicles;
6. barely reduces, as opposed to cutting off, torque to the slow-down track when steering;
7. also provides for counter-rotating the tracks for zero-radius steering; and
8. may also be used as a hydrostatic CVT for slow speeds and creepers.

In a further embodiment not shown, differential DFL is replaced with a straightforward bevel pinion/ring gear transmission interposed between a drive shaft and the axle shafts of the wheels. In this case, conventional steering systems are adopted, which, for example, provide for cutting off power transmission by means of a steering clutch, and possibly braking the right-side track to turn right. In this case, the main body is obviously supplied by the maker with said bevel pinion/ring gear transmission, as opposed to a differential.

Each track TK* of crawler vehicle 30 comprises, in known manner, a front idler 36; and an undercarriage 37 fitted with a number of supporting rollers 38 arranged in pairs, each of which comprises an inner roller and an outer roller rotating about a respective axis and positioned with their respective peripheral surfaces contacting the inner surface of the links of track TK* to hold track TK* on the ground and discharge the weight of the vehicle groundwards.

Undercarriage 37 also comprises a substantially U-shaped supporting structure 39.

An open first end 39a of supporting structure 39 has a shaft 40 fitted with idler 36, and which is an extension of an axle 18A on which front portion MB1 of main body MB rest.

A second end 39b of supporting structure 39 comprises a seat 41, in which is inserted a shaft 42 supporting the weight of intermediate portion MB2 and rear portion MB3 of main body MB.

In this case too, a brake device (not shown) may be interposed between flange FL and hydrostatic steering motor 12*.

In the crawler version (third embodiment) shown in FIGS. 10, 11, 12, 13, 14, 15, 16, a vehicle 50 comprises two crawler units 100 on opposite sides of the same main body AC as in the first two embodiments of the present invention.

Each crawler unit 100 comprises a trumpet TP (FIG. 13) for mechanical connection to an output shaft SH, and housing a hydrostatic steering motor 12* in known manner.

A propeller shaft 102, rotating about an axis of rotation (a), is connected mechanically to hydrostatic steering motor 12*, and transmits power to two drive sprockets 103 (only one shown in FIG. 10) via a train of gears 104, 105, 106 arranged in series. Each drive sprocket 103 meshes in known manner with the links of a track TK looped partly about drive sprocket 103.

Gear 104 is fitted to shaft 102, and gear 106 to a shaft 107 also fitted with drive sprockets 103.

Gear 105 transmits motion from gear 104 to gear 106, and is therefore fitted idly to a shaft 108.

Figure 10:
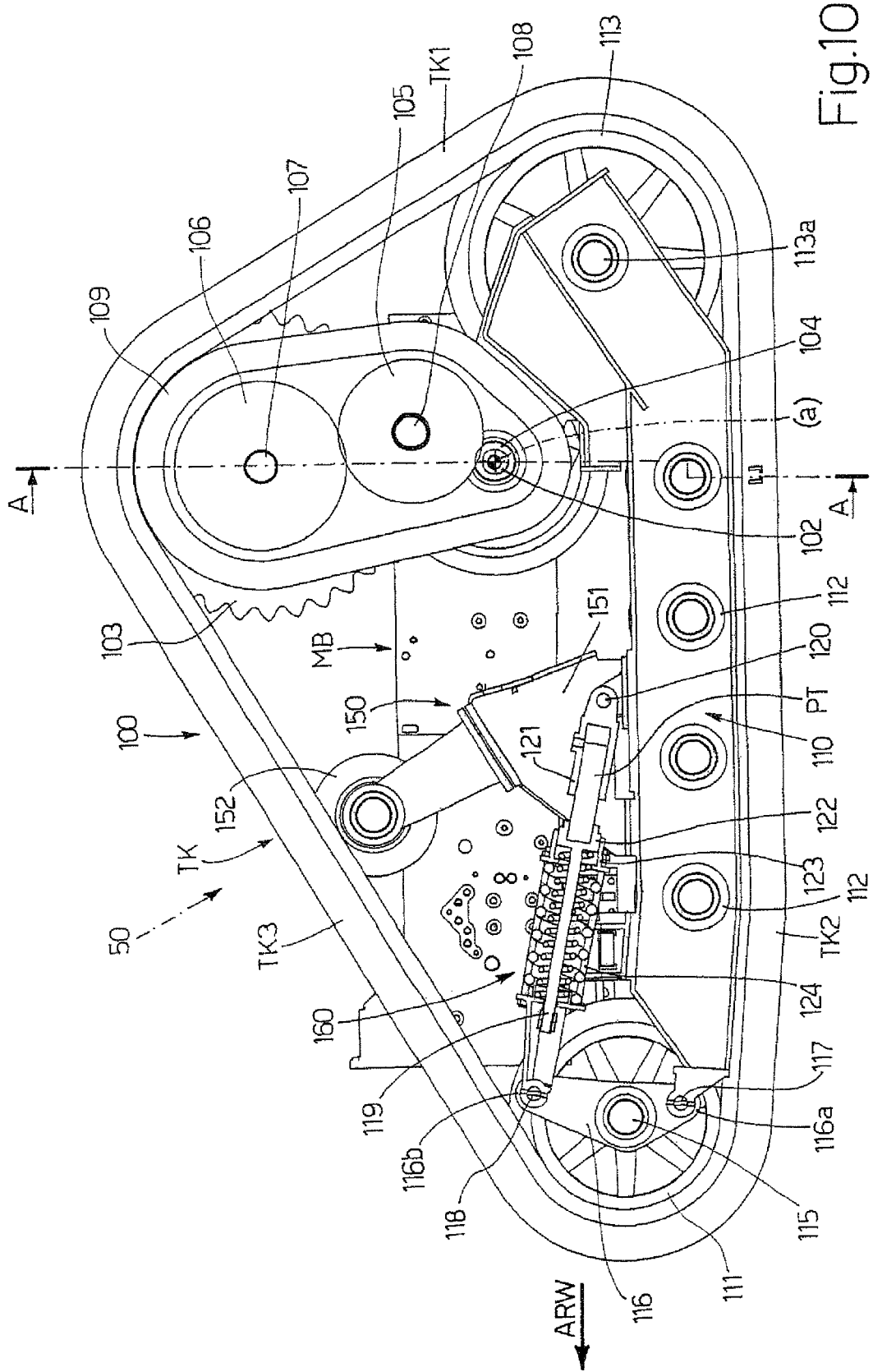
FIG. 10 shows a partial side view of a crawler vehicle in accordance with a third embodiment of the present invention and featuring the FIGS. 1, 2 and 3 "main body"

As shown in FIG. 10, shafts 102, 107, 108 are housed inside a casing 109 in turn fixed to an undercarriage 110 located between two rear idler wheels 113 and two front idler wheels 111 at the front of crawler unit 100.

Undercarriage 110 is fitted with a number of supporting rollers 112 arranged in pairs, each of which comprises an inner roller and an outer roller (only the inner roller shown in FIG. 10) rotating about a respective axis AX (FIG. 13) and positioned with their respective peripheral surfaces contacting the inner surface of the links of track TK to hold track TK on the ground and discharge the weight of the vehicle groundwards.

The triangular shape of track TK in the third embodiment is imparted by the two rear idler wheels 113 (FIG. 10), the rotation shaft 113*a* of which is also integral with undercarriage 110. Rear idler wheels 113 tension a rear branch TK1 of track TK together with drive sprockets 103, and act on a bottom branch TK2 of track TK together with front idler wheels 111 and supporting rollers 112.

A top branch TK3 of track TK is also stabilized using a track-tensioning device 150, which comprises a supporting structure 151 integral with undercarriage 110, and two top idler wheels 152 supporting branch TK3.

Front idler wheels 111, being designed to guide and keep track TK taut, are carriaged movably with respect to undercarriage 110 by means of a tensioning device 160 described in detail below with particular reference to FIG. 12.

A tensioning device 160 of the type used in the present invention enables fast, easy assembly/disassembly of track TK to/from crawler unit 100 (see below, FIGS. 14, 15) without having to split the track, as in the case of currently used spliceless rubber tracks.

Front idler wheels 111 are fitted to a hub 115, to which is hinged a link 116.

A first end 116*a* of link 116 is hinged to undercarriage 110 about a fulcrum 117; and a rod 119 of tensioning device 160 is hinged by a hinge 118 to a second end 116*b* of link 116.

Tensioning device 160 as a whole is hinged to undercarriage 110 by a hinge 120, and comprises, in addition to rod 119, a hydraulic cylinder 121 for imparting linear movement of rod 119.

When rod 119 is fully withdrawn (i.e. when the oil is drained from hydraulic cylinder 121) and tensioning device 160 as a whole is removed from hinge 120 (FIGS. 10, 14), front idler wheels 111 move inwards of crawler unit 100, and the surfaces of front idler wheels 111 lose their grip on the inner surface of track TK and are also detached from the guide channel (not shown) formed inside track TK, at which point, track TK can be changed.

Once the new track TK is carriaged, tensioning device 160 is simply hinged once more to hinge 120 (FIG. 10) and hydraulic cylinder 121 pressurized, so that a piston PT moves forward to push end 116*b* of link 116 outwards of crawler unit 100 (FIG. 15), and hub 115 rotates about fulcrum 117 to bring front idler wheels 111 back into contact with the inner surface of track TK.

Figure 11:
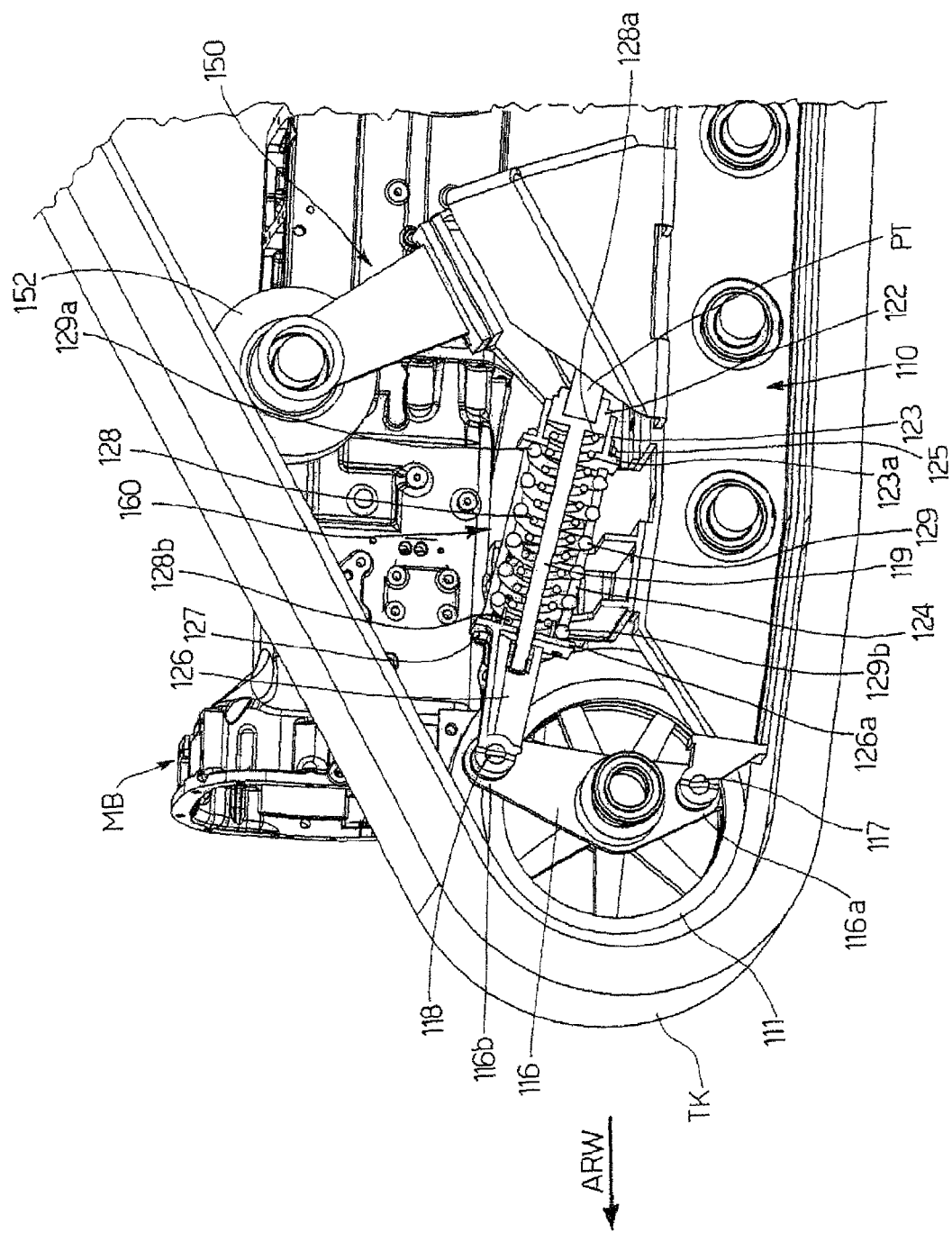
FIG. 11 shows a larger-scale detail of the third embodiment of the present invention in FIG. 10.
Figure 12:
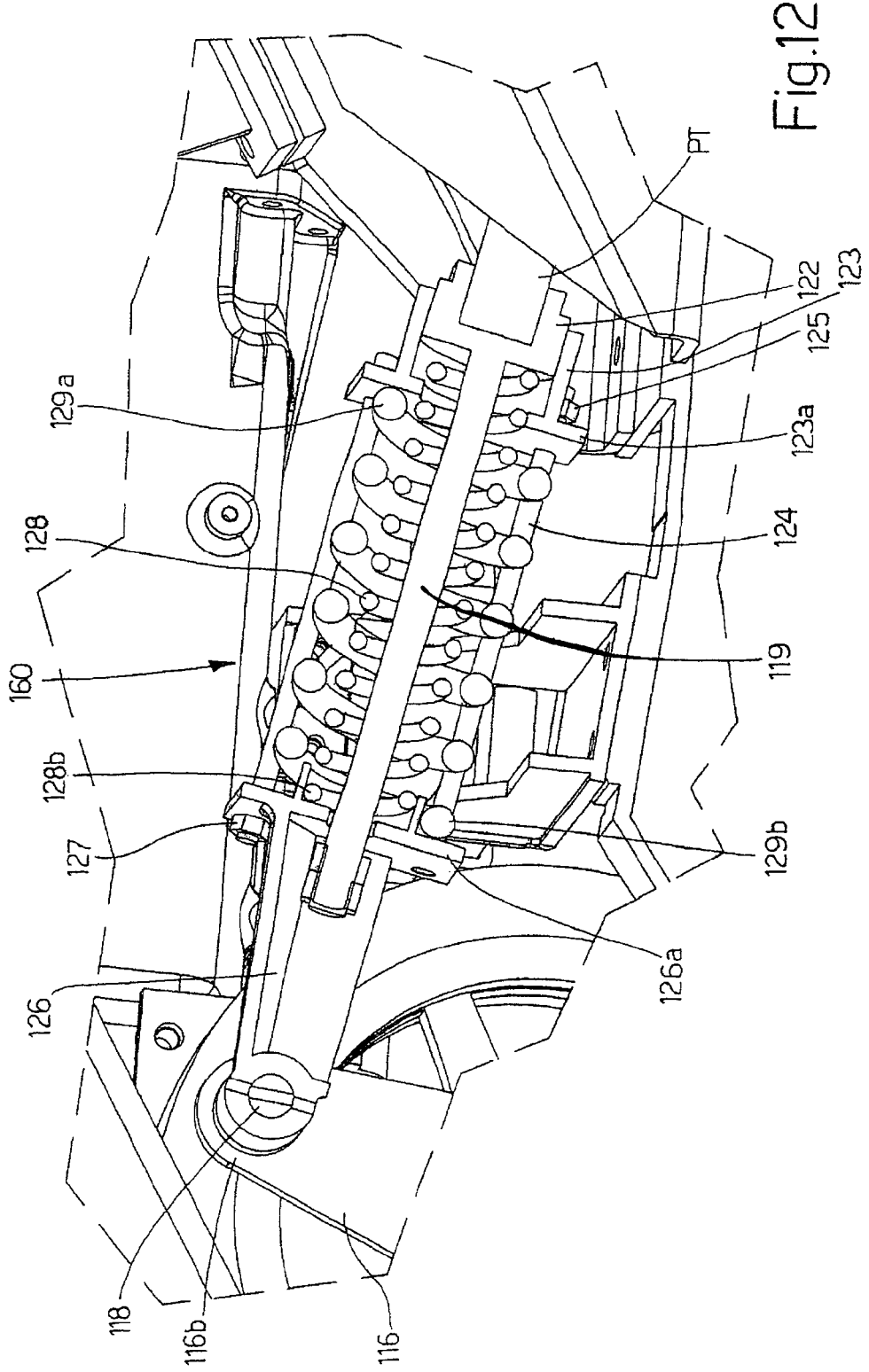
FIG. 12 shows a larger-scale detail of FIG. 11.
Figure 13:
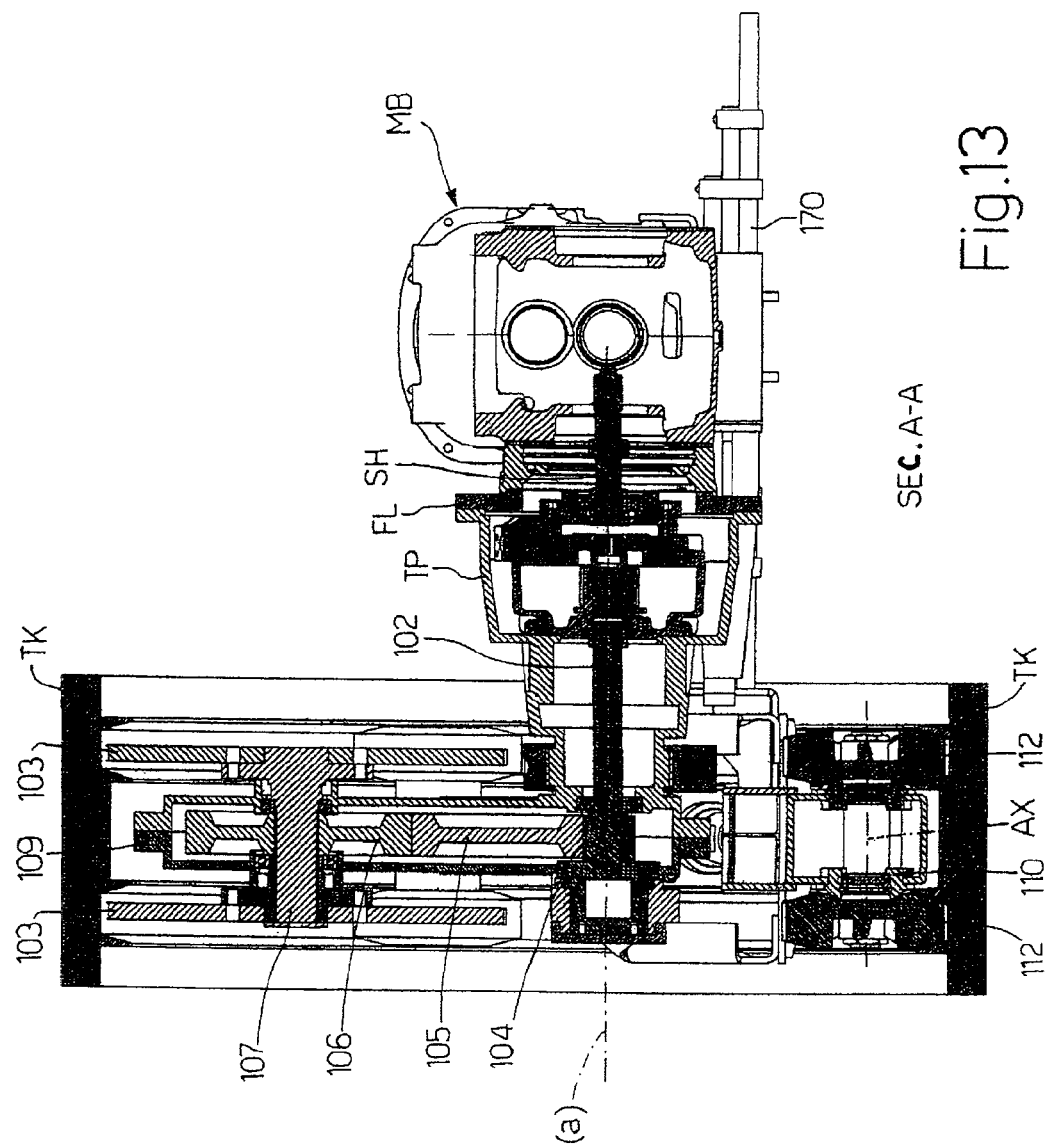
FIG. 13 shows a section along line A-A in FIG. 10.
Figure 14:
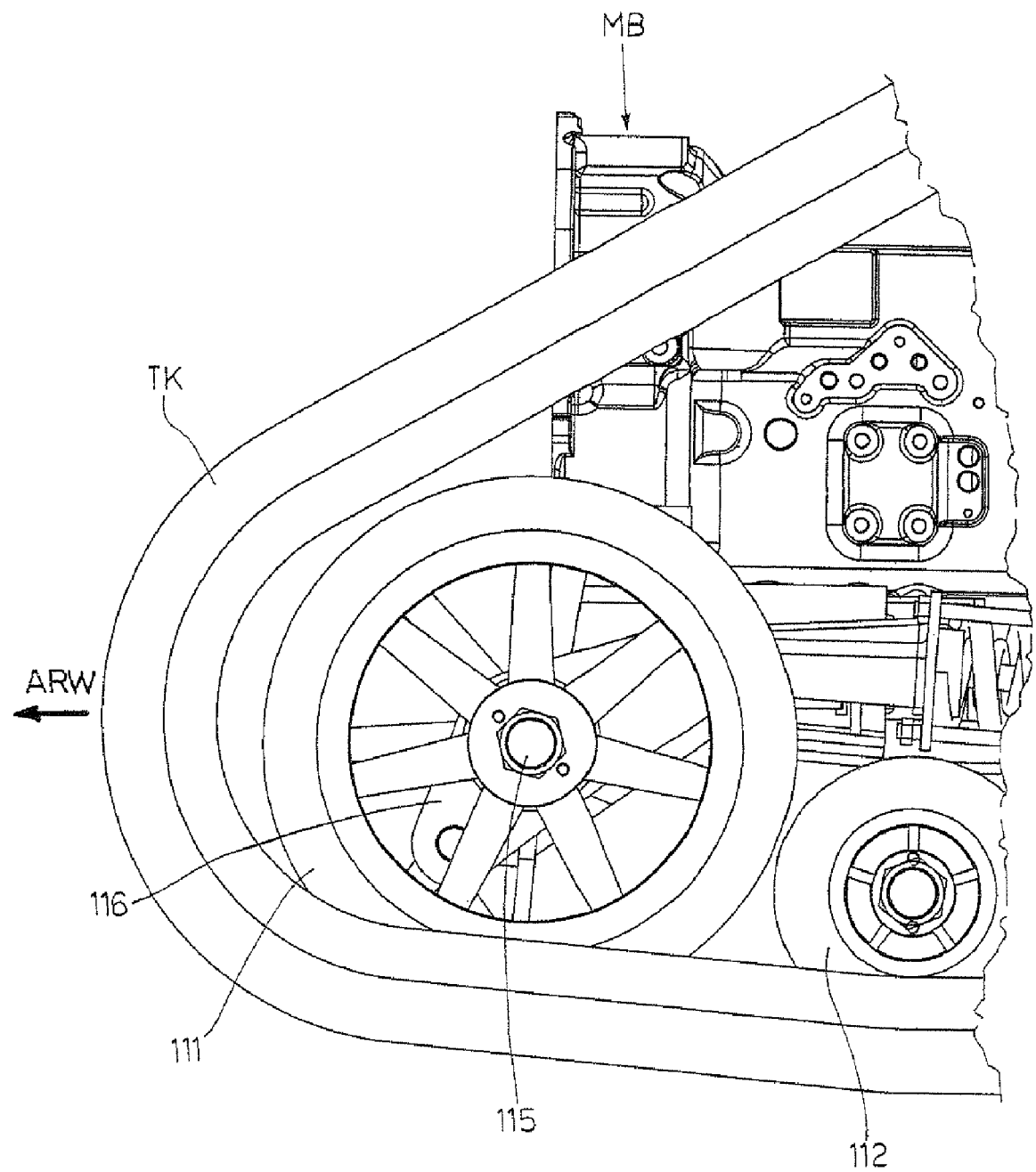
FIGS. 14 and 15 show release/engagement of the front idler wheels to change the track of a crawler vehicle as shown in FIGS. 10, 11, 12, 13.
Figure 15:
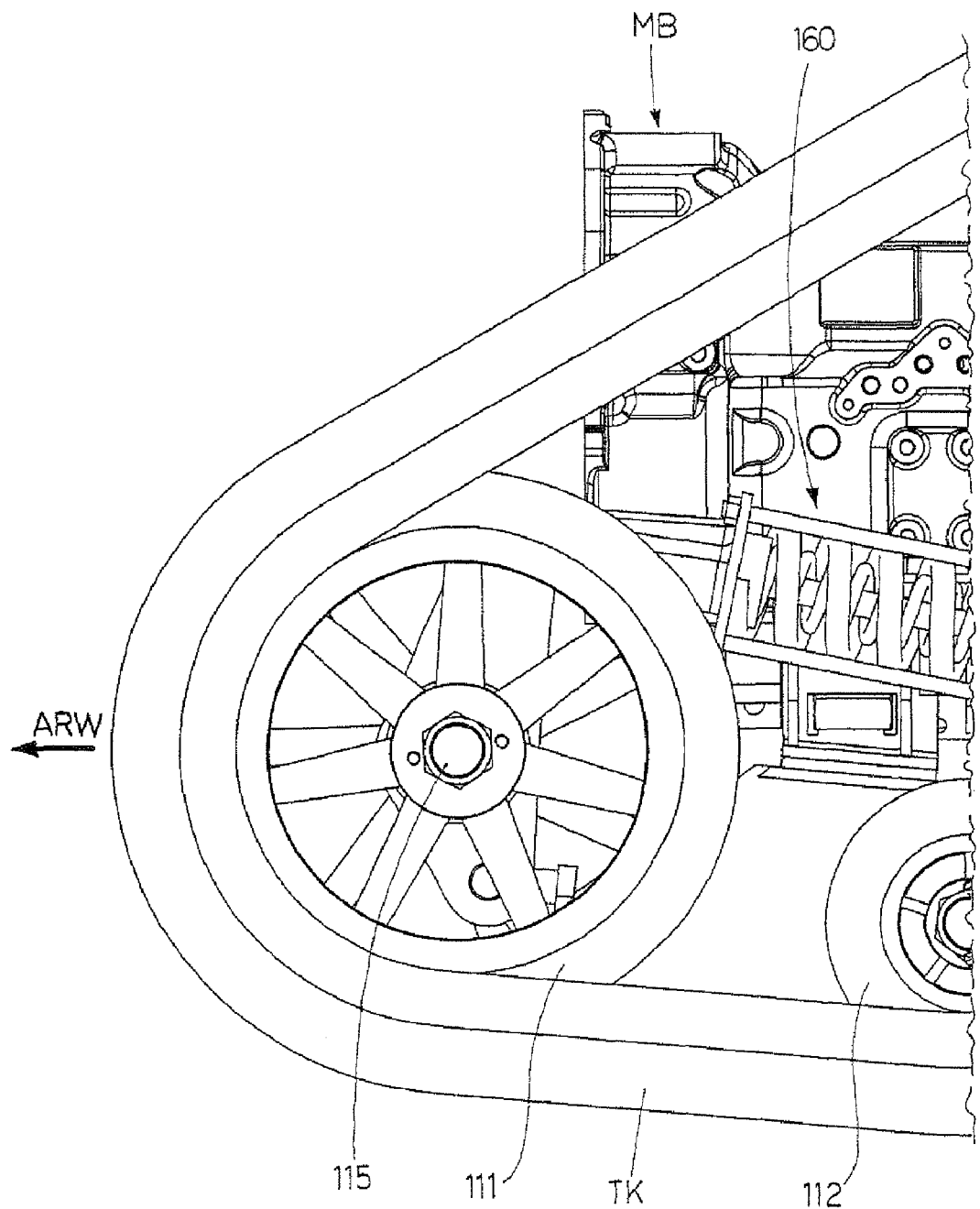

More specifically, as regards tensioning device 160, and as shown particularly in FIGS. 10, 11 and 12, rod 119 is integral with hydraulic piston PT sliding inside hydraulic cylinder 121, and is actually connected to hydraulic piston PT by a cup 122 which slides, in use, inside a cup-shaped body 123.

Cup-shaped body 123 comprises an outwardly-projecting flange 123*a*, in which a ring of holes is formed, each for receiving a respective guide rod 124, possibly fitted with a respective stop bolt 125.

At the opposite end to cup-shaped body 123, a hinge member 126 is hinged to link 116 by hinge 118.

More specifically, hinge member 126 comprises a flange 126*a* identical to flange 123*a* and also having holes fitted through with guide rods 124, possibly fitted with stop bolts 127.

Guide rods 124, in use, therefore slide freely inside the respective holes in flanges 123*a* and 126*a*, and travel a distance defined by the distance between stop bolts 125 at one end, and 127 at the other end.

A first spring 128, coaxial with and surrounding rod 119, has a first end 128*a* resting on cup 122, and a second end 128*b* resting, in use, on the inner surface of flange 126*a*.

As shown in FIGS. 11, 12, a second spring 129 is coaxial with both rod 119 and first spring 128, is larger in diameter than spring 128, and is formed by spirally winding music wire thicker than that of spring 128. The ends 129*a*, 129*b* of second spring 129 rest, in use, on the inner surfaces of flanges 123*a* and 126*a* respectively.

Two coaxial springs 128, 129 are used for the following reason whereas spring 128 provides for maintaining the right operating tension of track TK (by subjecting it, for example, to a force of a few hundred daN) when the vehicle is moving forward, spring 129 only comes into play when the vehicle develops traction stress when reversing, and track TK requires over ten times the force to prevent excessive back-up of front idler wheels 111 and, hence, excessive deformation of track TK.

Figure 16:
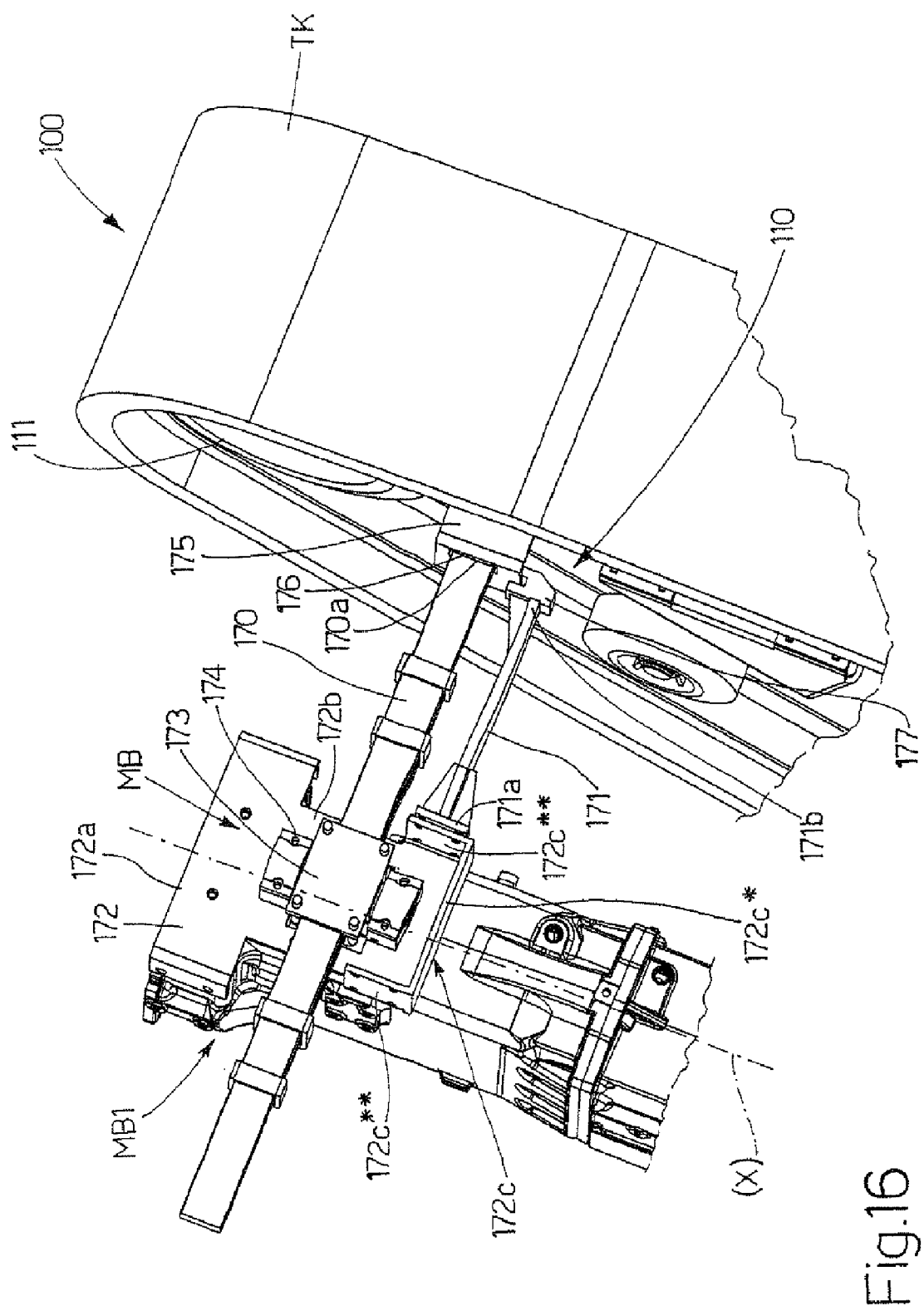
FIG. 16 shows a front suspension of the third embodiment of the present invention.

As shown in FIG. 16, the front of crawler unit 100 is connected mechanically to main body MB by a leaf spring 170 and a rigid spacer strut 171. More specifically, a fastening member 172 is bolted to main body MB. Fastening member 172 comprises a bracket-like, i.e. substantially C-shaped, first end portion 172*a* surrounding front portion MB1 of main body MB. Fastening member 172 also comprises an intermediate second portion 172*b* resting on main body MB; and a bracket-like third end portion 172*c* projecting outwards of main body MB.

More specifically, in a preferred non-limiting embodiment, end portion 172*c* has a central member 172*c perpendicular to the axis (X) of substantial longitudinal symmetry of main body MB; and two lateral members 172*c* parallel to axis (X) and extending laterally with respect to main body MB.

Figure 5:
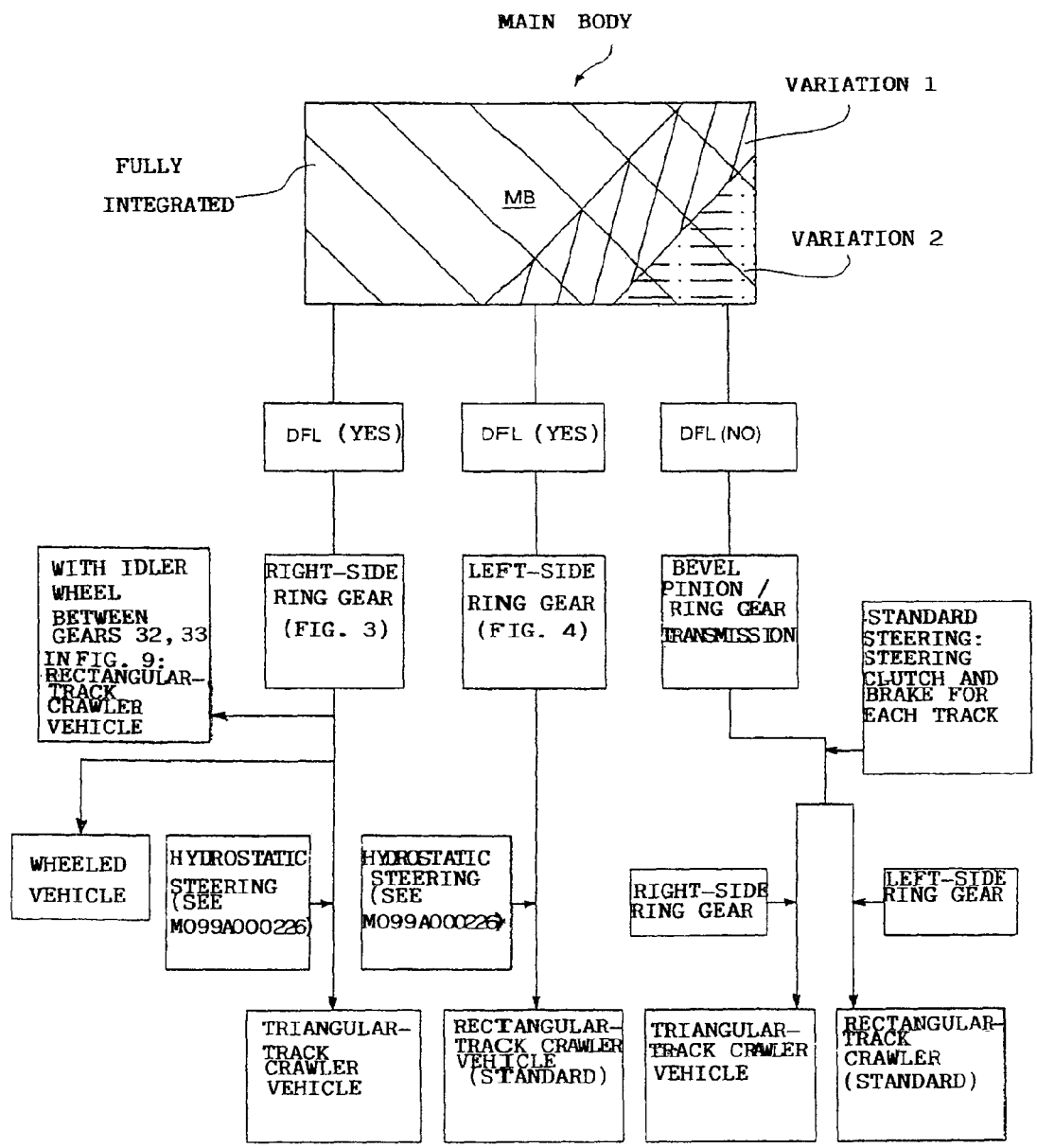
FIG. 5 shows a chart of the various options available, starting from the same "main body"

As shown in FIG. 16, leaf spring 170 is fixed in oscillating manner to intermediate second portion 172*b* by a plate 173 and bolts 174. A bracket 175, fixed to undercarriage 110, has an opening 176 for insertion of a free end 170*a* of leaf spring 170. A first end 171*a* of rigid spacer strut 171 is bolted to one of lateral members 172*c*, and a second end 171***b* has a C-shaped member 177 which engages bracket 175 to maintain the correct distance between unit 100 and main body MB, as shown in FIG. 5.

A fully integrated, standard main body MB featuring a differential DFL with a right-side ring gear CRN (FIG. 3) may form the basis for a wheeled vehicle (FIGS. 6, 7) or triangular-track crawler vehicle (FIGS. 10, 11, 12, 13, 14, 15, 16), with the option, for the triangular-track vehicle, of a hydrostatic steering system as described. A main body MB featuring a differential with a left-side ring gear CRN (FIG. 4), on the other hand, only forms the basis for a rectangular-track crawler vehicle (FIGS. 8, 9), also with an optional hydrostatic steering system.

A main body MB with a bevel pinion/ring gear transmission, as opposed to a differential, may be used, with a right-side ring gear, to form a triangular-track crawler vehicle, and, with a left-side ring gear, to form a rectangular-track crawler vehicle. Obviously, when employing a bevel pinion/ring gear transmission, the vehicle may be steered in the usual known way, substantially comprising a steering clutch and steering brake (not shown) for each track.

The main advantage of the present invention lies in enabling production of different wheeled or crawler vehicle models from the same main body, and so greatly reducing manufacturing cost.

I claim:

1. A vehicle, comprising:
a main body having at least an engine and a gearbox and configured to be fitted mechanically to form a wheeled vehicle, or to form a crawler vehicle;
the main body having a rear portion supporting and housing a differential,
the rear portion having two casings projecting therefrom on opposite sides of an axis of longitudinal symmetry of the main body, each casing having a casing flange mounted thereto with means by which to configure the vehicle as a wheeled vehicle or a rectangular track crawler vehicle, and each casing housing a projecting portion of a respective output shaft,
wherein the differential is connected mechanically to a drive shaft, by which it is powered, and to two hydrostatic steering motors located on opposite sides of the axis of longitudinal symmetry of the main body, wherein each one of the two hydrostatic steering motors is mounted to a respective one of the two casing flanges for receiving power from the differential to transmit to a respective drive wheel, and
wherein a ring gear of the differential can be arranged in a first position on a first lateral side of a drive shaft pinion to configure the vehicle to drive either one of wheels or triangular crawler tracks.

2. The vehicle as claimed in claim 1, wherein a front portion of the main body supports and houses the engine; a radiator and a respective fan; and a front protective casing.

3. The vehicle as claimed in claim 1, further comprising a speed reducer.

4. The vehicle as claimed in claim 1, wherein the ring gear of the differential can be placed in a second position on a second lateral side of the drive shaft bevel pinion with respect to the travelling direction of the vehicle, to configure the vehicle for driving a rectangular crawler track.

5. The vehicle as claimed in claim 1, wherein a respective speed reducer is connected to each hydrostatic steering motor.

6. The vehicle as claimed in claim 1, wherein the vehicle is configured as a vehicle having triangular crawler tracks and, for each track, front idler wheels are provided to guide and keep the track taut, the front idler wheels being carriaged to rotate with respect to an undercarriage.

7. The vehicle as claimed in claim 6, wherein the front idler wheels are carriaged on a hub to which a link is hinged.

8. The vehicle as claimed in claim 7, wherein a first end of the link is hinged to the undercarriage about a fulcrum, and a rod forming part of a tensioning device is hinged by a hinge to a second end of the link.

9. The vehicle as claimed in claim 6, wherein a tensioning device configured for acting on the front idler wheels is hinged as a whole to the undercarriage by a hinge, said tensioning device comprising a rod, and a hydraulic piston for moving the rod linearly.

10. The vehicle as claimed in claim 6, wherein a tensioning device configured for acting on the front idler wheels comprises a first and second spring coaxial with each other, wherein the first spring is positioned to maintain a tension on the track when the vehicle is moving in a forward direction, and wherein the second spring is positioned to exert a greater force than first spring when the vehicle develops traction stress when moving in a reversed direction.

11. The vehicle as claimed in claim 10, wherein the second spring is larger in diameter than the first spring, and wherein the second spring is formed by spirally winding a wire of elastic metal material thicker than the wire of the first spring.

12. A vehicle comprising:
a main body having at least an engine and a gearbox and configured to be fitted mechanically to form a wheeled vehicle, or to form a crawler vehicle;
the main body having a rear portion supporting and housing a differential, wherein, by using the differential with a ring gear in a first position, on a first lateral side of a drive shaft bevel pinion with respect to the travelling direction of the vehicle, a wheeled vehicle or a triangle tracked crawler vehicle configuration can be obtained;
wherein the rear portion also comprises two casings projecting on opposite sides of an axis of longitudinal symmetry of the main body; each casing having a casing flange with means by which to configure the vehicle as a wheeled vehicle or a rectangular track crawler vehicle, wherein each casing houses a projecting portion of a respective output shaft;
wherein the differential is connected mechanically to a drive shaft, by which it is powered, and to two hydrostatic steering motors located on opposite sides of the longitudinal axis of the main body, wherein each one of the two hydrostatic steering motors is mounted to a respective one of the two casing flanges for receiving power from the differential to transmit to a respective drive wheel; and
wherein each one of two propeller shafts shaft is connected mechanically to a respective one of the two hydrostatic steering motors, and transmits torque to a respective pair of drive sprockets via a train of gears arranged in series.

13. The vehicle as claimed in claim 12, wherein a front portion of the main body supports and houses the engine, a radiator and a respective fan, and a front protective casing.

14. The vehicle as claimed in claim 12, wherein the ring gear of the differential can be placed in a second position on a second lateral side of the drive shaft bevel pinion with respect to the travelling direction of the vehicle to configure the vehicle for driving a rectangular crawler tracks.

15. The vehicle as claimed in claim 12, wherein, the vehicle is configured as a vehicle having triangular tracks, each track having front idler wheels provided to guide and keep the track taut, the front idler wheels each being carriaged to rotate with respect to an undercarriage, wherein the front idler wheels are carriaged on a hub to which a link is hinged, and wherein a first end of the link is hinged to the undercarriage about a fulcrum, wherein a rod forming part of a tensioning device is hinged by a first hinge to a second end of the link.

16. The vehicle as claimed in claim 15, wherein the tensioning device is configured for acting on the front idler wheels and is hinged as a whole to the undercarriage by a second hinge, said tensioning device comprising the rod and a hydraulic piston for moving the rod linearly, wherein the tensioning device also comprises a first and second spring coaxial with each other, wherein the first spring is positioned to maintain a tension on the track when the vehicle is moving in a forward direction, wherein the second spring is positioned to exert a greater force than first spring when the vehicle develops traction stress when moving in a reversed direction, wherein the second spring is larger in diameter than the first spring, and wherein the second spring is formed by spirally winding a wire of elastic metal material thicker than the wire of the first spring.

* * * * *